(12) United States Patent
Mohri et al.

(10) Patent No.: US 6,900,407 B2
(45) Date of Patent: May 31, 2005

(54) ELECTRIC DISCHARGE MACHINE WITH REACTIVE FORCE COMPENSATED BY JUMP LOCUS ADJUSTMENT

(75) Inventors: Naotake Mohri, Tokyo (JP); Nagao Saitoh, Tokyo (JP); Mitsuaki Akune, Tokyo (JP); Hajime Ogawa, Tokyo (JP); Takayuki Nakagawa, Tokyo (JP); Yoshihito Imai, Tokyo (JP)

(73) Assignee: Mitusbishi Denki Kasushiki Kaisha, Tokyo (JP)

( * ) Notice: Subject to any disclaimer, the term of this patent is extended or adjusted under 35 U.S.C. 154(b) by 0 days.

(21) Appl. No.: 10/250,484

(22) PCT Filed: Jan. 9, 2001

(86) PCT No.: PCT/JP01/00047

§ 371 (c)(1),
(2), (4) Date: Nov. 12, 2003

(87) PCT Pub. No.: WO02/055249

PCT Pub. Date: Jul. 18, 2002

(65) Prior Publication Data

US 2004/0211758 A1 Oct. 28, 2004

(51) Int. Cl.[7] ................................................ B23H 7/18
(52) U.S. Cl. .................................................... 219/69.16
(58) Field of Search .......................... 219/69.13, 69.16, 219/69.17, 69.2; 700/162

(56) References Cited

U.S. PATENT DOCUMENTS

| | | | |
|---|---|---|---|
| 5,900,165 A | | 5/1999 | Taneda |
| 5,973,498 A | * | 10/1999 | Imai et al. .................. 324/452 |
| 6,608,275 B1 | * | 8/2003 | Nakagawa et al. ...... 219/69.16 |

FOREIGN PATENT DOCUMENTS

| | | | |
|---|---|---|---|
| JP | 7-124821 A | 5/1995 |
| JP | 8-155737 A | 6/1996 |
| JP | 9-272018 A | 10/1997 |
| JP | 10-296538 A | 11/1998 |
| JP | 3056928 B2 | 4/2000 |

OTHER PUBLICATIONS

Needs and information–processing Technology Proceed Technical Innovation, an electric discharge machining technique; Written by Nagao Saito, machine and tool (Jan. 2001).
Study on The Characteristics of Electrical Discharge Machining in Real Operation, Collected papers of The Japan Society for electrical machining, vol. 200, No. 39 (1987); Written by Mohri, Saito and Ishida.
PCT/JP00/03097 filed May 15, 2000.

* cited by examiner

*Primary Examiner*—Geoffrey S. Evans
(74) *Attorney, Agent, or Firm*—Sughrue Mion, PLLC

(57) ABSTRACT

In an electric discharge machine, wherein electric power is supplied between an electrode and a workpiece to machine the workpiece, a jumping motion is performed to temporarily increase a distance between the electrode and the workpiece. The electric discharge machine includes a detector for detecting a machining reaction force; a setting unit for setting a specified value of the machining reaction force; a comparator for comparing a detected value of the machining reaction force with a specified value of the machining reaction force; and a changing unit for changing a locus of the jumping motion so that the machining reaction force can be reduced if the comparator finds that the detected value of the machining reaction force is greater than the specified value of the machining reaction force.

5 Claims, 6 Drawing Sheets

ELECTRIC DISCHARGE MACHINE WITH REACTIVE FORCE COMPENSATED BY JUMP LOCUS ADJUSTMENT

TECHNICAL FIELD

The present invention relates to improvements in an electric discharge machine to conduct machining on a workpiece by generating electric discharge between an electrode and the workpiece in a machining solution. More particularly, the present invention relates to improvements in an electric discharge machine in which a reaction force caused in machining when a distance between the electrodes is changed can be suppressed to a value not more than a specified value.

BACKGROUND ART

FIG. 4 is an arrangement view showing a conventional electric discharge machine. In the view, reference numeral 1 is an electrode, reference numeral 2 is a workpiece, reference numeral 3 is a machining solution, reference numeral 4 is a machining tank, reference numeral 5 is an electrode holding jig, reference numeral 6 is a surface plate for fixing the workpiece 2, reference numerals 7 and 8 are respectively X-axis and Y-axis for relatively moving the electrode 1 and the workpiece 2 on X-Y plane, reference numeral 9 is Z-axis which is a primary axis for relatively moving the electrode 1 and the workpiece 2 in direction Z, reference numerals 10, 11 and 12 are respectively X-axis servo amplifier, Y-axis servo amplifier and Z-axis servo amplifier for driving servo motors not shown to drive X-axis, Y-axis and Z-axis, reference numeral 13 is a machining electric power supply means, and reference numeral 14 is an NC device.

The machining solution 3 fills the machining tank 4, machining electric power to be used as electric discharge energy is supplied to between the electrode 1 and the workpiece 2 by the machining electric power supply means 13, the electrode 1 and the workpiece 2 are relatively moved by X-axis, Y-axis and Z-axis, which are positioning means, and the workpiece 2 is machined by electric discharge generated between the electrodes.

NC device 14 governs relative positioning control for relatively positioning the electrode 1 and the workpiece 2 by the positioning means and also governs control of the electric machining condition.

In the electric discharge machine, other than the control (machining servo control) for controlling a distance between the electrode 1 and the workpiece 2 in the process of electric discharge machining, it is necessary to provide a means for removing scraps, which have been generated in the process of electric discharge machining, from between the electrodes so that the scraps can not stay between them. As one of the means for removing scraps, what is called a jumping motion is used in which electric discharge machining is interrupted at regular intervals and the electrode 1 is quickly reciprocated with respect to the workpiece 2. Scraps can be removed from between the electrodes by a pumping action caused by this jumping motion, so that electric discharge machining can be stably maintained.

In the electric discharge machine, machining is carried out in a machining solution which is a viscous fluid. Therefore, when a distance between the electrodes is changed, a fluid force is generated by viscosity of the machining solution.

An intensity of this reaction force F caused in machining can be expressed by the following formula (Stefan's Formula), $$F = (3 \cdot v \cdot V \cdot S^2)/(2 \cdot \pi \cdot G^3) \quad (1)$$

where $v$ is a coefficient of viscosity of the machining solution, $V$ is a relatively moving speed of the electrode to the workpiece, $S$ is an electrode area and $G$ is a distance between the electrodes.

The following can be understood from the above formula (1). A high intensity of reaction force F is generated in the process of electric discharge machining when electrode area S is large, when relative moving speed V of the electrode to the workpiece is high in the case of a jumping motion and when distance G between the electrodes is small.

FIG. 5 is a graph showing a result obtained when reaction force F, which is generated in machining in the case where distance G between the electrode and the workpiece is changed, is measured with a hydraulic servo electric discharge machine. This graph shows a case in which electrode area S is 9.6 cm$^2$, and relative moving speed V of the electrode to the workpiece is 4 mm/s. In the electric discharge machining condition in which distance G between the electrodes is approximately 7 $\mu$m, an intensity of reaction force F generated is approximately 440 N (about 45 kgf). In this case, stress caused in the process of machining is approximately 46 N/cm$^2$ (about 4.7 kgf/cm$^2$). Since hydraulic servo control is conducted in this case, relative speed V of the electrode to the workpiece is 4 mm/s, which is lower than the relative speed in the case of linear motor servo control by two figures. Even in this case, reaction force, the intensity of which is approximately 440 N (stress caused in machining, the intensity of which is approximately 46 N/cm$^2$), is generated.

By utilizing the result shown in FIG. 5, from the relation shown by formula (1), it is possible to calculate an intensity of reaction force F generated in the process of machining in which relative speed V of the electrode to the workpiece and electrode area S are changed. FIG. 6(a) shows an intensity of reaction force F generated in the process of machining in which electrode area S is 9.6 cm$^2$ and relative moving speed V of the electrode to the workpiece is 400 mm/s. This relative moving speed of the electrode to the workpiece can be realized by linear motor servo control. FIG. 6(b) shows an intensity of reaction force F generated in the process of machining in which electrode area S is 100 cm$^2$ and relative moving speed V of the electrode to the workpiece is 4 mm/s. It can be understood that an intensity of reaction force F generated in the process of machining is increased to a value close to the maximum value 44000 N (4500 kgf) in either the case shown in FIG. 6(a) or the case shown in FIG. 6(b).

In the above electric discharge machine in which electric discharge machining is conducted in a machining solution, when the distance between the electrodes is changed by a jumping motion, a reaction force is necessarily generated in the process of machining. Since the reaction force of a high intensity is repeatedly given to between the electrodes, a protective circuit in NC device is activated and operation is stopped in the middle of electric discharge machining. At the worst, the electrode and parts to drive the primary shaft are damaged. Further, since deformation of the entire primary shaft section to support the electrode is increased in proportion to the intensity of the reaction force caused in the process of machining, the final machining accuracy of the workpiece is deteriorated. Especially when an electrode, the area of which is large, is used, when a jumping speed is high and when a small distance between the electrodes is maintained in the case of finishing, an intensity of the reaction force is increased in the process of machining. Therefore, in the case of setting the machining condition, it is necessary to take countermeasures so that a jumping motion speed of the primary shaft can be suppressed.

For example, JP-A-7-124821 discloses a primary shaft load reducing device of the electric discharge machine in which a detected peak value of motor torque in one process of the jumping motion is compared with a predetermined reference value, and according to the result of the comparison, the speed of the next jumping motion is determined by using correction data previously stored.

The above prior art is based on the method in which an intensity of reaction force F generated in machining is suppressed by reducing relative moving speed V of the electrode to the workpiece according to Stefan's Formula (1). When V is reduced, a ratio of the jumping time, which is a waste of time not contributing to machining, is increased. Accordingly, the entire machining time is increased and the productivity of electric discharge machining is decreased, which causes a problem.

Further, the following problems may be encountered. Vibration of the electric discharge machine is excited by the reaction force of machining in the case of a jumping motion. By this vibration, the machining accuracy is deteriorated and further the machining time is increased, which deteriorates the productivity of electric discharge machining.

SUMMARY OF THE INVENTION

The present invention has been accomplished to solve the above problems. It is an object of the present invention to provide an electric discharge machine characterized in that an intensity of the reaction force of machining can be reduced to an approximately half of the specified value and a jumping time can be reduced, so that damage of parts of the primary driving shaft can be prevented and deterioration of the accuracy of machining can be prevented and the productivity can be enhanced.

It is another object of the present invention to provide an electric discharge machine characterized in that vibration caused by a jumping motion can be suppressed so that the deterioration of machining accuracy can be prevented and the productivity can be enhanced.

The present invention provides an electric discharge machine in which electric power for machining is supplied by a machining electric power supply means to between an electrode and a workpiece provided in a machining solution, electric discharge machining is conducted on the workpiece while the electrode and the workpiece are relatively being moved by a positioning means, and a jumping motion, by which the electrode is relatively moved from the workpiece by the positioning means so as to increase temporarily a distance between the electrode and the workpiece, is conducted, the electric discharge machine comprising: a machining reaction force detecting means for detecting a machining reaction force; a machining reaction force specified value setting means for setting a specified value of the machining reaction force; a machining reaction force comparing means for comparing a detected value of the machining reaction force, which is detected by the machining reaction force detecting means, with a specified value of the machining reaction force which is set by the machining reaction force specified value setting means; and a motion locus changing means for changing a locus of the jumping motion so that the machining reaction force can be reduced in the case where the machining reaction force comparing means finds that the detected value of the machining reaction force is higher than the specified value of the machining reaction force.

The present invention provides an electric discharge machine, wherein the motion locus changing means makes the electrode and the workpiece operate while relative moving speed V of the electrode to the workpiece is maintained substantially constant in the case where it is found by the machining reaction force comparing means in the middle of motion of increasing the distance between the electrodes that the detected value of the machining reaction force is higher than the specified value of the machining reaction force, and the motion locus changing means changes a locus of the jumping motion so that an absolute value of relative moving speed V can be lower than setting speed $Vs = k \cdot Vmax$ in the case where it is found by the machining reaction force comparing means in the middle of motion of decreasing the distance between the electrodes that the detected value of the machining reaction force is higher than the specified value of the machining reaction force, wherein $0 < k < 1$, Vmax is the maximum attainable speed, $Vmax = (f \cdot 2 \cdot \pi \cdot G^3)/(3 \cdot v \cdot S^2)$, f is a specified value of the machining reaction force, G is a distance between the electrodes, v is a coefficient of viscosity of the machining solution, and S is an electrode area.

The present invention provides an electric discharge machine in which electric power for machining is supplied by a machining electric power supply means to between an electrode and a workpiece provided in a machining solution, electric discharge machining is conducted on the workpiece while the electrode and the workpiece are relatively being moved by a positioning means, and a jumping motion, by which the electrode is relatively moved from the workpiece by the positioning means so as to increase temporarily a distance between the electrode and the workpiece, is conducted, the electric discharge machine comprising: a deformation detecting means for detecting a deformation of the electric discharge machine body; a deformation specified value setting means for setting a specified value of the deformation of the electric discharge machine body; a deformation comparing means for comparing a detected value of the deformation detected by the deformation detecting means with a specified value of the deformation which is set by the deformation specified value setting means; and a motion locus changing means for changing a locus of the jumping motion so that the deformation can be reduced in the case where the deformation comparing means finds that the detected value of the deformation is higher than the specified value of the deformation.

The present invention provides an electric discharge machine in which electric power for machining is supplied by a machining electric power supply means to between an electrode and a workpiece provided in a machining solution, electric discharge machining is conducted on the workpiece while the electrode and the workpiece are relatively being moved by a positioning means, and a jumping motion, by which the electrode is relatively moved from the workpiece by the positioning means so as to increase temporarily a distance between the electrode and the workpiece, is conducted, the electric discharge machine comprising: a machining stress detecting means for detecting machining stress; a machining stress specified value setting means for setting a specified value of machining stress; a machining stress comparing means for comparing the detected value of machining stress detected by the machining stress detecting means with the specified value of machining stress which is set by the machining stress specified value setting means; and a motion locus changing means for changing a locus of the jumping motion so that the machining stress can be reduced in the case where the machining stress comparing means finds that the detected value of the machining stress is higher than the specified value of the machining stress.

The present invention provides an electric discharge machine, wherein the specified value is changed according to the machining area and the machining condition.

The present invention provides an electric discharge machine, wherein a command value of the relative moving speed of the electrode to the workpiece in the jumping motion is synthesized as Fourier series, and this Fourier series is synthesized while the n-th component of the Fourier series is being removed or this Fourier series is synthesized while the components of higher degrees than the n-th component are being removed in the case where the n-th frequency component of the Fourier series coincides with the resonance frequency of the mechanical system or the n-th frequency component of the Fourier series is similar to the resonance frequency of the mechanical system.

The present invention provides an electric discharge machine, wherein a command value of the relative moving speed of the electrode to the workpiece in the jumping motion is synthesized as Fourier series, and this Fourier series is synthesized while the amplitude of the n-th component of the Fourier series is made to be small or this Fourier series is synthesized while the amplitudes of the components of higher degrees than the n-th component are made to be minute in the case where the n-th frequency component of the Fourier series coincides with the resonance frequency of the mechanical system or the n-th frequency component of the Fourier series is similar to the resonance frequency of the mechanical system.

Since the electric discharge machine of the present invention is composed as described above, it is possible to conduct precise control in which a reaction force of machining and a specified value are compared with each other in real time. Therefore, the reaction force of machining can be suppressed to a value substantially not more than the specified value, and a jumping motion time can be reduced. Accordingly, it is possible to prevent parts for driving the primary shaft from being damaged and further it is possible to prevent the machining accuracy from deteriorating. Furthermore, it is possible to enhance the productivity of electric discharge machining.

Even when a locus is suddenly changed in the process of a jumping motion according to an increase in the reaction force of machining, it is possible to prevent deterioration of machining accuracy which is caused by the excitation of mechanical resonance. Further, it is possible to prevent an increase in the machining time which is caused by residual vibration.

DETAILED DESCRIPTION OF THE INVENTION

Figure 1:
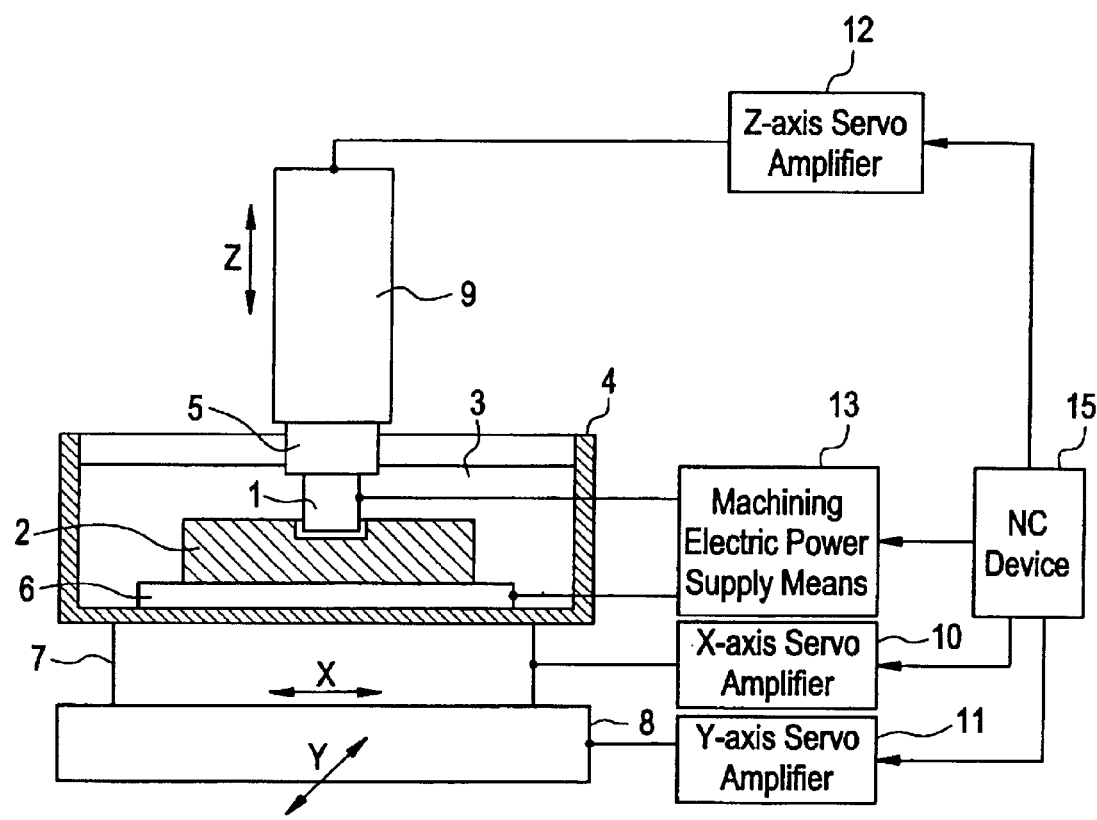
FIG. 1 is an arrangement view showing an electric discharge machine of an embodiment of the present invention.

FIG. 1 is an arrangement view showing an electric discharge machine of an embodiment of the present invention.

In the view, reference numeral 1 is an electrode, reference numeral 2 is a workpiece, reference numeral 3 is a machining solution, reference numeral 4 is a machining tank, reference numeral 5 is an electrode holding jig, reference numeral 6 is a surface plate for fixing the workpiece 2, reference numerals 7 and 8 are respectively X-axis and Y-axis for relatively moving the electrode 1 and the workpiece 2 on X-Y plane, reference numeral 9 is Z-axis which is a primary axis for relatively moving the electrode 1 and the workpiece 2 in direction Z, reference numerals 10, 11 and 12 are respectively X-axis servo amplifier, Y-axis servo amplifier and Z-axis servo amplifier for driving and controlling servo motors not shown to drive X-axis, Y-axis and Z-axis, reference numeral 13 is a machining electric power supply means, and reference numeral 15 is an NC device.

The machining solution 3 fills the machining tank 4, machining electric power to be used as electric discharge energy is supplied to between the electrode 1 and the workpiece 2 by the machining electric power supply means 13, the electrode 1 and the workpiece 2 are relatively moved by X-axis, Y-axis and Z-axis, which are positioning means, and the workpiece 2 is machined by electric discharge generated between the electrodes.

NC device 15 governs relative positioning control for relatively positioning the electrode 1 and the workpiece 2 by the positioning means and also governs control of the electric machining condition. NC device 15 controls a machining servo motion and a predetermined jumping motion for removing scraps produced in the process of electric discharge machining.

Figure 2:
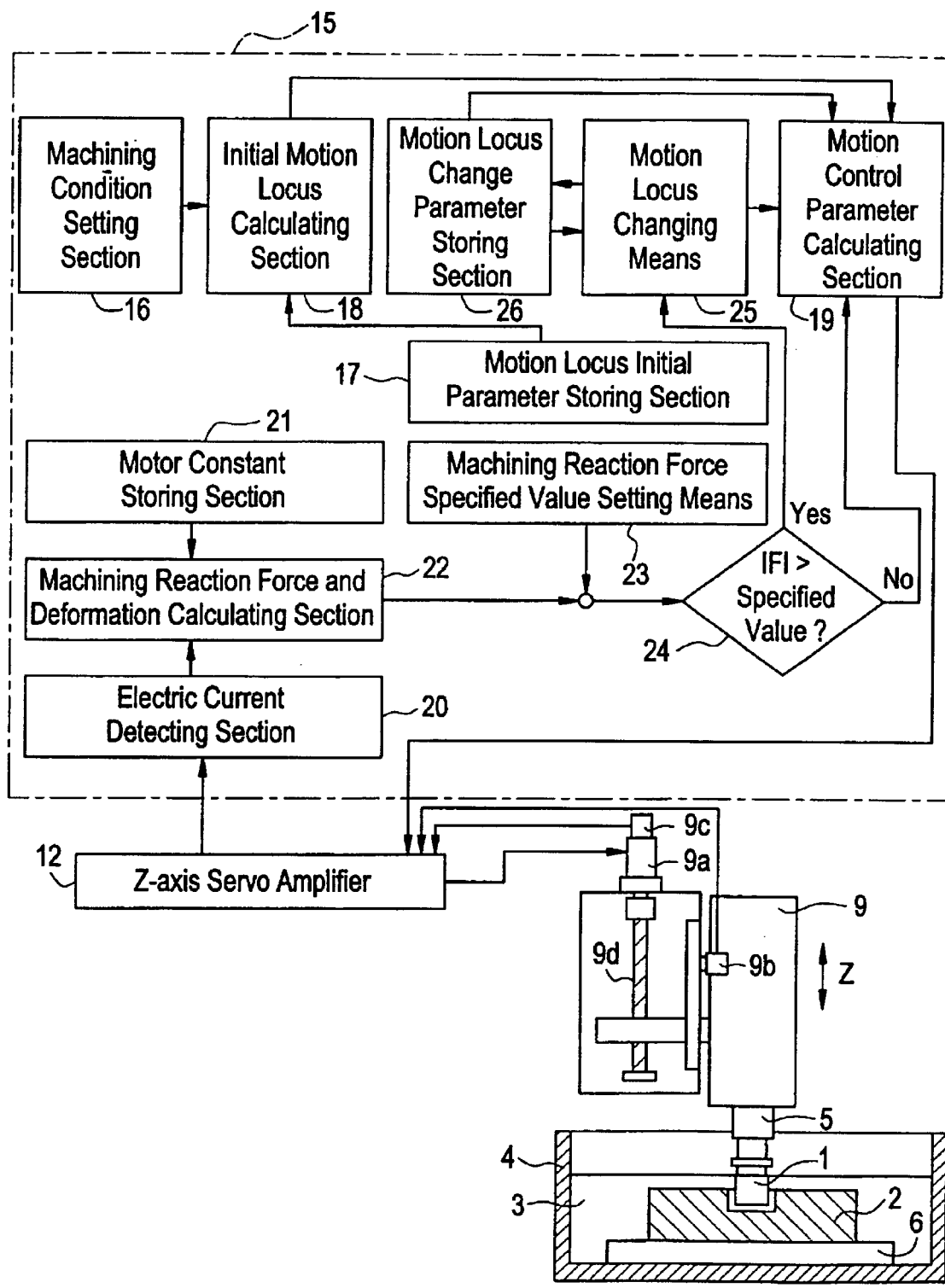
FIG. 2 is a block diagram for explaining a jumping motion of an electric discharge machine of an embodiment of the present invention.

FIG. 2 is a block diagram for explaining a jumping motion conducted in the electric discharge machine of the embodiment of the present invention. Like reference characters are used to indicate like parts in FIGS. 1 and 2. In FIG. 2, reference numeral 9a is a servo motor for driving Z-axis, reference numeral 9b is a position detector, reference numeral 9c is a speed detector, reference numeral 9d is a ball screw, reference numeral 16 is a machining condition setting section for setting an electric condition, a jumping motion condition and others, reference numeral 17 is a motion locus initial parameter storing section for making a motion locus corresponding to the machining condition which is set in the machining condition setting section 16, reference numeral 18 is an initial motion locus calculating section for calculating a motion locus by using a machining condition, which is set in the machining condition setting section 16, and also by using a parameter of the motion locus initial parameter storing section 17 corresponding to the machining condition, reference numeral 19 is a motion control parameter calculating section for sending command data for each servo command period to the servo amplifier 12 while a correction such as a backlash correction is being added, reference numeral 20 is an electric current detecting section for detecting an electric current of the servo motor 9a for driving Z-axis, reference numeral 21 is a motor constant storing section, reference numeral 22 is a machining reaction force and deformation calculating section, reference numeral 23 is a machining reaction force specified value setting means, reference numeral 24 is a machining reaction force comparing means, reference numeral 25 is a motion locus changing means, and reference numeral 26 is a motion locus change parameter storing section.

Position data of Z-axis 9, which is a primary shaft, is detected by the position detector 9b and input to the Z-axis servo amplifier 12. A rotary speed of the servo motor 9a for driving Z-axis is detected by the speed detector 9c and input to the Z-axis servo amplifier 12.

In the driving device for driving Z-axis 9 composed of the servo motor 9a for driving Z-axis and the ball screw 9d, a driving force and an electric current of the motor are proportional to each other. Therefore, it is possible to find an intensity of the machining reaction force by using a motor constant of the servo motor 9a for driving Z-axis. According to the data of the motor constant storing section 21 in which a set of constants of the servo motor 9a for driving Z-axis are stored and also according to the motor current detected by the electric current detecting section 20, the machining reaction force and deformation calculating section 22 calculates a driving load, and an intensity of the machining reaction force can be found when a force of inertia of the movable section relating to the motion of Z-axis is subtracted from this driving load. Further, since the machining reaction force and deformation calculating section 22 is provided with a conversion table for converting a force into a deformation, it is possible to find a deformation of the electric discharge machine body from the machining reaction force.

In the block diagram shown in FIG. 2, the electric current detecting section 20, the motor constant storing section 21 and the machining reaction force and deformation calculating section 22 correspond to the machining reaction force detecting means and the deformation detecting means.

For example, a specified value of the machining reaction force, which is set in the machining reaction force specified value setting means 23, may be set at a value at which the allowable load is the lowest when consideration is given to the allowable load of parts of the primary shaft, and the allowable load of the attaching strength of the electrode and the electrode holding jig. The specified value of the machining reaction force may be manually set. Alternatively, the specified value of the machining reaction force may be set according to the calculated value based on the electrode profile data. Since this specified value is changed by a change in the machining area and the machining condition, the machine is composed in such a manner that the setting of the specified value can be changed even in the process of electric discharge machining.

The machining reaction force comparing means 24 compares the specified value, which is set by the machining reaction force specified value setting means 23, with the machining reaction force which is found by the machining reaction force and deformation calculating section 22 in real time.

The motion locus changing means 25 conducts calculation for changing a motion locus in the case where the machining reaction force comparing means 24 judges that an intensity of the machining reaction force is higher than that of the specified value.

The motion locus change parameter storing section 26 stores a motion locus change control parameter in the case where the motion locus changing means 25 is operated.

A control parameter of the motion locus, which has been determined by the calculation conducted by the motion locus changing means 25, is stored by the motion locus change parameter storing section 26. In the case where it is unnecessary to change the motion locus in the next jumping motion, the motion control parameter calculating section 19 draws out a control parameter from the motion locus change parameter storing section 26 and sends command data for each servo command period to the servo amplifier 12 while a correction is added to it.

Figure 3:
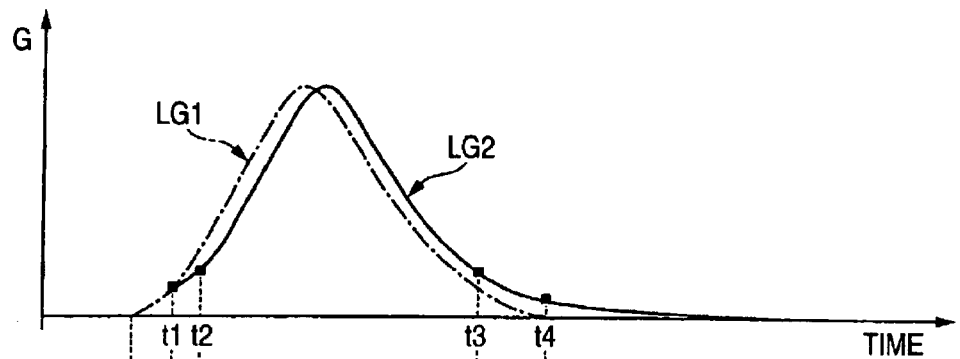
FIG. 3 is a schematic illustration for explaining control of a jumping motion conducted according to a result of comparison obtained from a machining reaction force comparing means in an electric discharge machine of an embodiment of the present invention.
Figure 3:
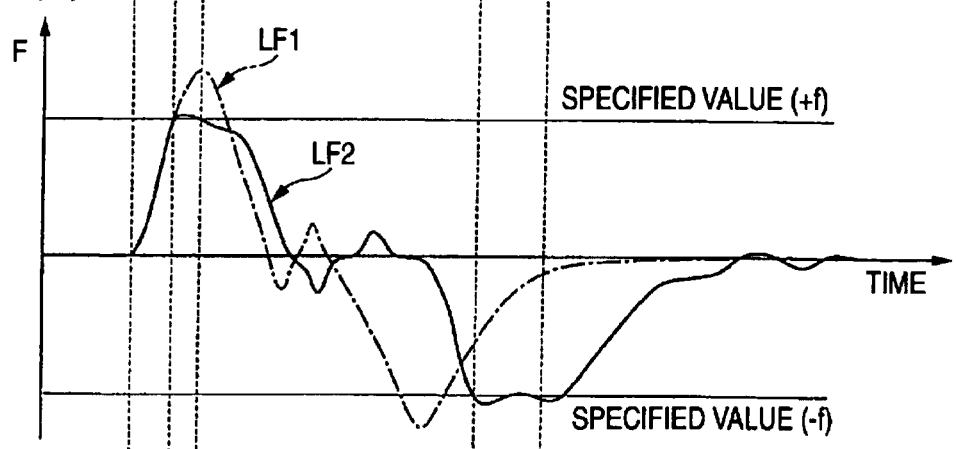
Figure 3:
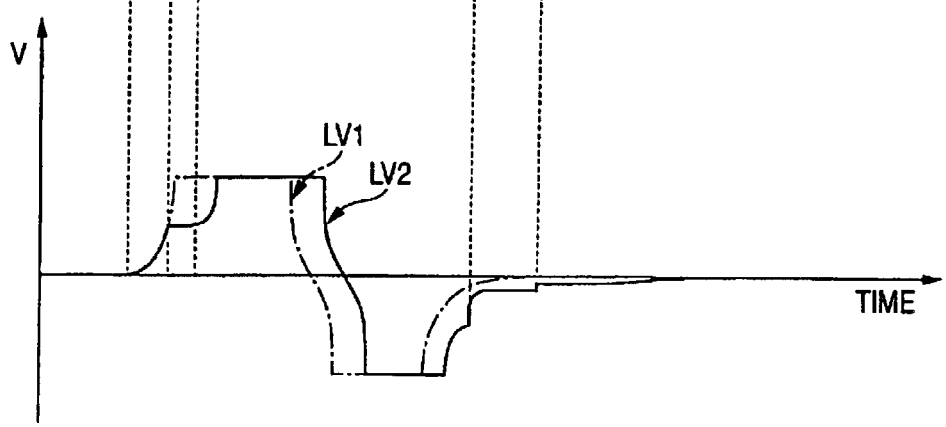
Figure 4:
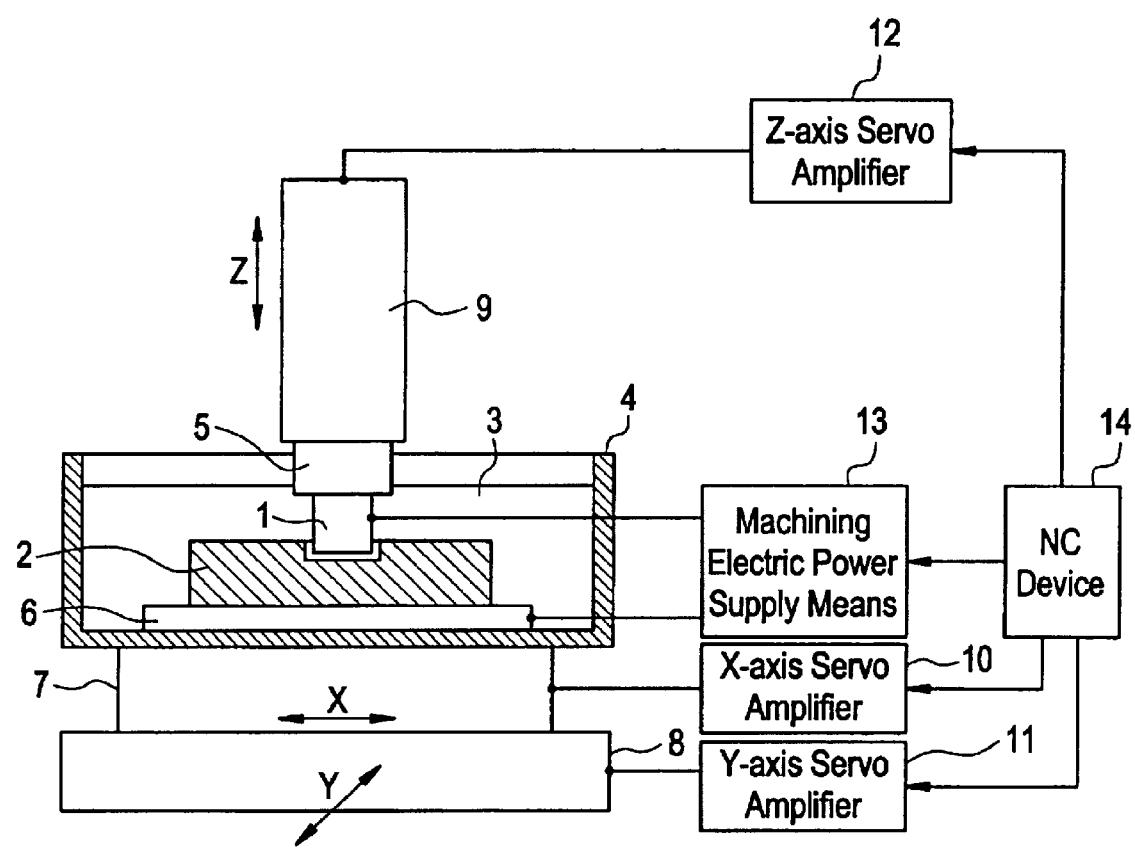
FIG. 4 is an arrangement view of a conventional electric discharge machine.
Figure 5:
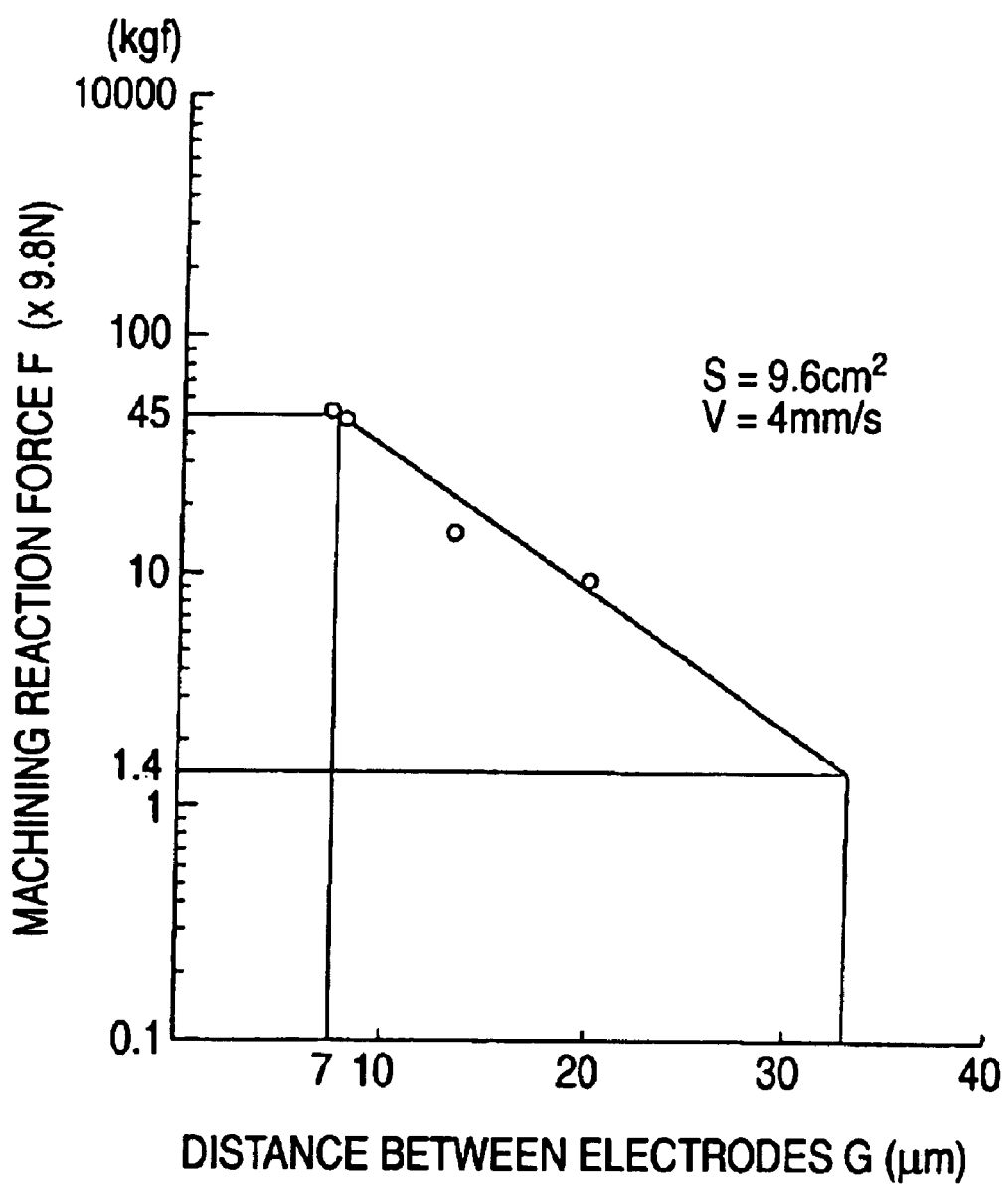
FIG. 5 is a view showing an example of measurement of a machining reaction force generated when a distance between an electrode and a workpiece is changed.
Figure 6:
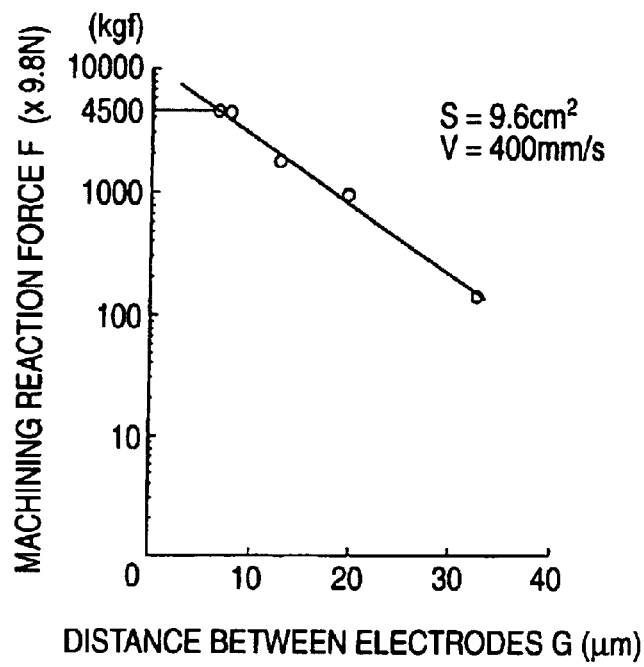
FIG. 6 is a view showing a relation between a machining reaction force and a distance between the electrodes.
Figure 6:
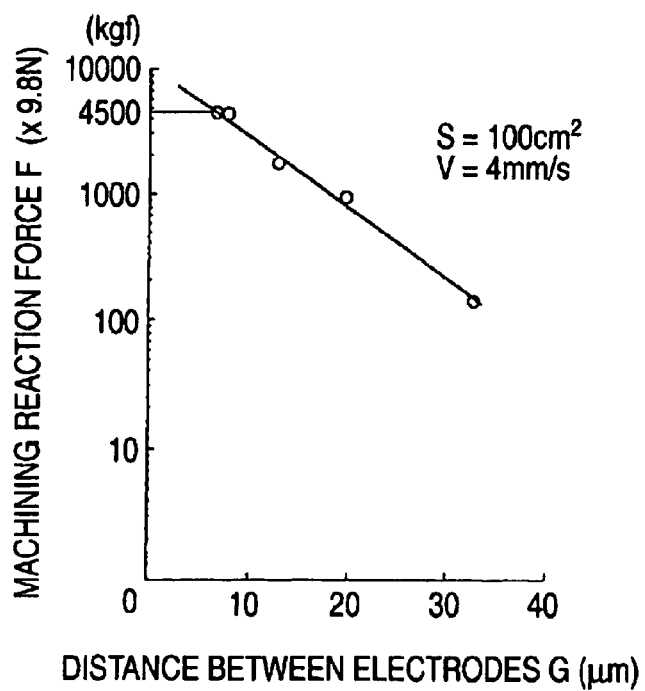

FIG. 3 is a schematic illustration for explaining control of a jumping motion conducted according to the result of comparison obtained from the machining reaction force comparing means 24. FIGS. 3(a) to 3(c) show examples of changes in distance G between the electrodes, machining reaction force F and relative moving speed V of the workpiece with respect to the time. In FIG. 3, LG1 is an initial motion locus, LG2 is a motion locus after the initial motion locus is changed (hereinafter referred to as "changed motion locus"), LF1 is a machining reaction force detected by the motion of the initial motion locus, LF2 is a machining reaction force detected by the motion of the changed motion locus, LV1 is a relative moving speed of the electrode to the workpiece in the initial motion locus, and LV2 is a relative moving speed of the electrode to the workpiece in the changing motion locus.

In FIG. 3, in the case where a motion is conducted by initial motion locus LG1 and an absolute value of machining reaction force F exceeds specified value f according to the result of comparison made by the machining reaction force comparing means 24 (time t1), the motion is conducted, for example, while relative moving speed V is maintained substantially constant by the motion locus changing means 25. The reason why the motion is conducted in this way is explained as follows. At the point of time t1, the motion is being conducted in a direction in which distance G between the electrodes is increased. In this state, distance G between the electrodes and relative moving speed V are increasing. However, according to Stefan's Formula (1), machining reaction force F is proportional to relative moving speed V and in inverse proportional to the cube of distance G between the electrodes. Therefore, when relative moving speed V is maintained constant, machining reaction force F is decreased according to an increase in distance G between the electrodes.

After that, in the case where distance G between the electrodes is increased and the machining reaction force comparing means 24 obtains a result of comparison that an absolute value of machining reaction force F becomes lower than specified value f (time t2), the motion locus changing means 25 changes the motion locus to the same motion locus as that of initial motion locus LV1.

In the case where the machining reaction force comparing means 24 obtains a result of comparison that an absolute value of machining reaction force F exceeds specified value f while the motion is being conducted in a direction in which distance G between the electrodes is decreased (time t3), the motion locus changing means 25 decreases an absolute value of relative moving speed V to a value not more than setting speed Vs. This setting speed Vs may be found as follows. By the formula $Vmax = (f \cdot 2 \cdot \pi \cdot G^3)/(3 \cdot v \cdot S^2)$, which is obtained when Stefan's Formula (1) is modified, it is possible to find the maximum attainable speed Vmax on the basis of specified value f of machining reaction force F. Therefore, this setting speed Vs may be found in such a manner that this maximum attainable speed Vmax is multiplied by a predetermined coefficient. That is, the motion is conducted while relative moving speed V is set at a value not more than setting speed Vs ($Vs = k \cdot Vmax$ ($0 < k < 1$)).

The reason why the motion is conducted in this way is described as follows. At the point of time t3, the motion is being conducted in a direction in which distance G between the electrodes is decreased. In this state, according to Stefan's Formula (1), machining reaction force F is in inverse proportion to the cube of distance G between the electrodes. Therefore, in order to decrease machining reaction force F which tends to increase when distance G between the electrodes is decreasing, it is necessary that relative moving speed V is made to be not more than setting speed Vs.

After that, when distance G between the electrodes is further decreased and an absolute value of machining reaction force F is increased again to a value not less than specified value f (time t4), the motion locus changing means 25 performs the same calculation as that of control conducted at the above time t3 so that relative moving speed V is made to be not more than setting speed Vs, and further an absolute value of relative moving speed V is decreased.

Due to the above motion locus control, an intensity of machining reaction force LF2 detected by change motion locus LG2 can be made to be a value substantially not more than specified value f of the machining reaction force.

Since control is precisely conducted by comparing the machining reaction force with the specified value in real time as described above, that is, since a speed of the jumping motion as a whole is not simply increased or decreased, the machining reaction force can be substantially made to be a value not more than the specified value and further the jumping motion as a whole time can be reduced. Accordingly, the productivity of electric discharge machining can be enhanced. Further, the present invention can be applied to a case in which an electrode is used, the profile of which is complicated, frequently used in an actual electric discharge machining.

In the above case in which the jumping motion is conducted, when command value V(t) of the relative moving speed of the electrode to the workpiece is synthesized as Fourier series shown as follows, the machining time can be further prevented from increasing.

$$V(t) = \Sigma(Ak \cdot \sin(\omega k \cdot t + \theta) + Bk \cdot \cos(\omega k \cdot t + \theta)) \qquad (2)$$

In this case, k=1, 2, ..., t is time, and θ is an initial phase. In Formula (2), in the case where this Fourier series is synthesized while the n-th component of the Fourier series of command value V(t) of the relative moving speed of the electrode to the workpiece is being removed or this Fourier series is synthesized while the components of higher degrees than the n-th component are being removed in the case where the n-th frequency component of the Fourier series coincides with the resonance frequency of the mechanical system of the electric discharge machine or the n-th frequency component of the Fourier series is similar to the resonance frequency of the mechanical system. Alternatively, this Fourier series is synthesized while the amplitude of the n-th component of the Fourier series is made to be small or this Fourier series is synthesized while the amplitudes of the components of higher degrees than the n-th component are made to be minute.

The resonance frequency of the mechanical system of the electric discharge machine can be previously grasped by an experiment of analyzing a vibration mode. When a speed command is used which is synthesized by Fourier series in which the n-th component of the Fourier series is being removed or this Fourier series is synthesized while the components of higher degrees than the n-th component are being removed in the case where the n-th frequency component of the Fourier series coincides with the resonance frequency of the mechanical system or the n-th frequency component of the Fourier series is similar to the resonance frequency of the mechanical system. Due to the foregoing, even when a locus is suddenly changed in the process of a jumping motion according to an increase in the reaction force of machining, it is possible to prevent deterioration of machining accuracy which is caused by the excitation of mechanical resonance. Further, it is possible to prevent an increase in the machining time which is caused by residual vibration.

In the above explanations, a specified value of the machining reaction force is set in the machining reaction force specified value setting means 23, and this specified value of the machining reaction force is compared with a detected value of the machining reaction force. However, since the machining reaction force and deformation calculating means 22 can convert a force into a deformation, a specified value of the deformation is set instead of the specified value of the machining reaction force of the machining reaction force specified value setting means 23, and this specified value of the deformation is compared with the deformation detected by the machining reaction force and deformation calculating means 22, and control may be performed according to the result of the comparison. Alternatively, machining stress F/S is found by machining reaction force F and electrode area S, and a specified value of machining stress is set instead of the specified value of the machining reaction force of the machining reaction force specified value setting means 23, and this specified value of machining stress is compared with the above machining stress F/S, and control may be conducted according to the result of the comparison.

In the above explanations, the machining reaction force and the deformation are detected by a calculation using electric current detection of the servo motor for driving Z-axis and also using the motor constant. However, the machining reaction force and the deformation may be directly detected by sensors. For example, the machining reaction force can be detected by a force sensor or a pressure sensor, and the deformation can be detected by a laser beam displacement sensor or an electrostatic capacity type displacement sensor.

The above explanations are made into an example of the electric discharge machine in which a driving force is transmitted via the ball screw 9d as shown in FIG. 2. However, the present invention may be applied to an electric discharge machine driven by a linear motor without using the ball screw 9d.

INDUSTRIAL APPLICABILITY

As described above, the electric discharge machine of the present invention is suitably used for electric discharging work in which electric discharge is generated between an electrode and a workpiece in a machining solution and the workpiece is machined by this electric discharge energy.

What is claimed is:

1. An electric discharge machine, wherein a machining electric power supply means supplies electric power between an electrode and a workpiece provided in a machining solution for machining the workpiece, wherein the electrode and the workpiece are relatively movable by a positioning means, and wherein a jumping motion, which relatively moves the electrode from the workpiece by the positioning means so as to increase temporarily a distance between the electrode and the workpiece, is conducted, the electric discharge machine comprising:

a machining reaction force detecting means for detecting a machining reaction force;

a machining reaction force specified value setting means for setting a specified value of the machining reaction force;

a machining reaction force comparing means for comparing a detected value of the machining reaction force, which is detected by the machining reaction force detecting means, with a specified value of the machining reaction force, which is set by the machining reaction force specified value setting means; and a motion locus changing means for changing a locus of the jumping motion so that the machining reaction force can be reduced if the machining reaction force comparing means finds that the detected value of the machining reaction force is greater than the specified value of the machining reaction force.

wherein a command value of the relative moving speed of the electrode to the workpiece in the jumping motion is synthesized as a Fourier series, and the Fourier series is synthesized while the n-th component of the Fourier series is being removed or the Fourier series is synthesized while the components of higher degrees than the n-th component are being removed if the n-th frequency component of the Fourier series coincides with the resonance frequency of the mechanical system or the n-th frequency component of the Fourier series is similar to the resonance frequency of the mechanical system.

2. An electric discharge machine, wherein a machining electric power supply means supplies electric power between an electrode and a workpiece provided in a machining solution for machining the workpiece, wherein the electrode and the workpiece are relatively movable by a positioning means, and wherein a jumping motion, which relatively moves the electrode from the workpiece by the positioning means so as to increase temporarily a distance between the electrode and the workpiece, is conducted, the electric discharge machine comprising:

a machining reaction force detecting means for detecting a machining reaction force;

a machining reaction force specified value setting means for setting a specified value of the machining reaction force;

a machining reaction force comparing means for comparing a detected value of the machining reaction force, which is detected by the machining reaction force detecting means, with a specified value of the machining reaction force, which is set by the machining reaction force specified value setting means; and a motion locus changing means for changing a locus of the jumping motion so that the machining reaction force can be reduced if the machining reaction force comparing means finds that the detected value of the machining reaction force is greater than the specified value of the machining reaction force, wherein a command value of the relative moving speed of the electrode to the workpiece in the jumping motion is synthesized as a Fourier series, and the Fourier series is synthesized while the amplitude of the n-th component of the Fourier series is made to be small or the Fourier series is synthesized while the amplitudes of the components of higher degrees than the n-th component are made to be small if the n-th frequency component of the Fourier series coincides with the resonance frequency of the mechanical system or the n-th frequency component of the Fourier series is similar to the resonance frequency of the mechanical system.

3. An electric discharge machine, wherein a machining electric power supply means supplies electric power between an electrode and a workpiece provided in a machining solution for machining the workpiece, wherein the electrode and the workpiece are relatively movable by a positioning means, and wherein a jumping motion, which relatively moves the electrode from the workpiece by the positioning means so as to increase temporarily a distance between the electrode and the workpiece, is conducted, the electric discharge machine comprising:

a machining reaction force detecting means for detecting a machining reaction force;

a machining reaction force specified value setting means for setting a specified value of the machining reaction force;

a machining reaction force comparing means for comparing a detected value of the machining reaction force, which is detected by the machining reaction force detecting means, with a specified value of the machining reaction force, which is set by the machining reaction force specified value setting means; and a motion locus changing means for changing a locus of the jumping motion so that the machining reaction force can be reduced if the machining reaction force comparing means finds that the detected value of the machining reaction force is greater than the specified value of the machining reaction force, wherein the motion locus changing means makes the electrode and the workpiece operate with a moving speed V of the electrode relative to the workpiece being maintained substantially constant if the machining reaction force comparing means finds, in the middle of motion of increasing the distance between the electrode and the workpiece, that the detected value of the machining reaction force is greater than the specified value of the machining reaction force, and the motion locus changing means changes a locus of the jumping motion so that an absolute value of the moving speed V can be less than a setting speed $Vs = k \cdot Vmax$ if the machining reaction force comparing means finds, in the middle of motion of decreasing the distance between the electrode and the workpiece, that the detected value of the machining reaction force is greater than the specified value of the machining reaction force, wherein $0<k<1$, Vmax is the maximum attainable speed, $Vmax = (f \cdot 2 \cdot \pi \cdot G^3)/(3 \cdot vS^2)$, f is a specified value of the machining reaction force, G is a distance between the electrodes, v is a coefficient of viscosity of the machining solution, and S is an electrode area.

4. An electric discharge machine according to claim 3, wherein a command value of the moving speed of the electrode relative to the workpiece in the jumping motion is synthesized as a Fourier series, and the Fourier series is synthesized while the n-th component of the Fourier series is being removed or the Fourier series is synthesized while the components of higher degrees than the n-th component are being removed if the n-th frequency component of the Fourier series coincides with the resonance frequency of the mechanical system or the n-th frequency component of the Fourier series is similar to the resonance frequency of the mechanical system.

5. An electric discharge machine according to claim 3, wherein a command value of the moving speed of the electrode relative to the workpiece in the jumping motion is synthesized as a Fourier series, and the Fourier series is synthesized while the amplitude of the n-th component of the Fourier series is made to be small or the Fourier series is synthesized while the amplitudes of the components of higher degrees than the n-th component are made to be small if the n-th frequency component of the Fourier series coincides with the resonance frequency of the mechanical system or the n-th frequency component of the Fourier series is similar to the resonance frequency of the mechanical system.

* * * * *